US010834765B2

(12) United States Patent
Qi et al.

(10) Patent No.: US 10,834,765 B2
(45) Date of Patent: Nov. 10, 2020

(54) APPARATUS, SYSTEM AND METHOD OF SETTING UP A CONNECTION FOR COMMUNICATION BETWEEN NAN DEVICES

(71) Applicant: INTEL CORPORATION, Santa Clara, CA (US)

(72) Inventors: Emily H. Qi, Gig Harbor, WA (US); Carlos Cordeiro, Portland, OR (US); Harish Balasubramaniam, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 3 days.

(21) Appl. No.: 16/036,034

(22) Filed: Jul. 16, 2018

(65) Prior Publication Data

US 2019/0037619 A1 Jan. 31, 2019

Related U.S. Application Data

(63) Continuation of application No. 14/570,008, filed on Dec. 15, 2014, now Pat. No. 10,051,676.
(Continued)

(51) Int. Cl.
*H04W 76/14* (2018.01)
*H04W 8/00* (2009.01)
(Continued)

(52) U.S. Cl.
CPC ......... *H04W 76/14* (2018.02); *H04L 67/1068* (2013.01); *H04L 67/12* (2013.01);
(Continued)

(58) Field of Classification Search
CPC ..... H04W 76/14; H04W 12/06; H04W 8/005; H04W 88/02; H04W 92/18; H04W 84/12;
(Continued)

(56) References Cited

U.S. PATENT DOCUMENTS 8,363,581 B2 1/2013 Kim et al.
8,892,722 B1 11/2014 Kopikare et al.
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Christopher P Grey
(74) *Attorney, Agent, or Firm* — Shichrur & Co.

(57) ABSTRACT

Some demonstrative embodiments include apparatuses, systems and/or methods of Peer to Peer communication. For example, a first wireless device may include a radio to send a first Neighbor Awareness Network (NAN) Service discovery frame including a first Robust peer-to-peer attribute, and to receive from a second wireless device a second NAN Service discovery frame including a second Robust peer-to-peer attribute, the first peer-to-peer attribute including first availability information to indicate at least one first channel and one or more first time slots, the second peer-to-peer attribute including second availability information to indicate at least one second channel and one or more second time slots; and a controller to setup a Robust peer-to-peer connection with the second peer-to-peer device based on the first and second availability information.

18 Claims, 4 Drawing Sheets

Related U.S. Application Data

(60) Provisional application No. 62/072,640, filed on Oct. 30, 2014.

(51) Int. Cl.
| | |
|---|---|
| *H04W 12/06* | (2009.01) |
| *H04L 29/08* | (2006.01) |
| *H04W 12/00* | (2009.01) |
| *H04W 92/18* | (2009.01) |
| *H04W 88/02* | (2009.01) |
| *H04W 84/12* | (2009.01) |

(52) U.S. Cl.
CPC .............. *H04L 67/16* (2013.01); *H04W 8/005* (2013.01); *H04W 12/003* (2019.01); *H04W 12/06* (2013.01); *H04W 84/12* (2013.01); *H04W 88/02* (2013.01); *H04W 92/18* (2013.01)

(58) Field of Classification Search
CPC ...... H04W 12/003; H04L 67/16; H04L 67/12; H04L 67/1068
See application file for complete search history.

(56) References Cited

U.S. PATENT DOCUMENTS

| | | | |
|---|---|---|---|
| 9,521,192 B2 | 12/2016 | Qi | |
| 9,888,366 B2 | 2/2018 | Qi | |
| 10,051,676 B2* | 8/2018 | Qi | H04W 8/005 |
| 2005/0036469 A1 | 2/2005 | Wentink | |
| 2007/0008922 A1* | 1/2007 | Abhishek | H04W 72/02 |
| | | | 370/329 |
| 2007/0104138 A1 | 5/2007 | Rudolf et al. | |
| 2007/0211680 A1 | 9/2007 | Laroia et al. | |
| 2008/0031193 A1 | 2/2008 | Laroia et al. | |
| 2009/0016456 A1 | 1/2009 | Li et al. | |
| 2009/0310517 A1 | 12/2009 | Narayanan et al. | |
| 2010/0177718 A1* | 7/2010 | Harle | H04W 72/00 |
| | | | 370/329 |
| 2011/0082940 A1 | 4/2011 | Montemurro et al. | |
| 2011/0306301 A1* | 12/2011 | Lubetzky | H04W 72/02 |
| | | | 455/62 |
| 2012/0230280 A1 | 9/2012 | Chandra et al. | |
| 2013/0322297 A1 | 12/2013 | Dominguez | |
| 2013/0343283 A1 | 12/2013 | Laroia et al. | |
| 2014/0126503 A1 | 5/2014 | Kim et al. | |
| 2015/0139213 A1* | 5/2015 | Abraham | H04L 69/28 |
| | | | 370/338 |
| 2015/0172391 A1 | 6/2015 | Kasslin et al. | |
| 2016/0128113 A1 | 5/2016 | Qi et al. | |
| 2016/0165653 A1* | 6/2016 | Liu | H04L 67/104 |
| | | | 370/329 |
| 2016/0205529 A1* | 7/2016 | Oren | H04W 8/005 |
| | | | 370/336 |
| 2016/0205616 A1* | 7/2016 | Oren | H04W 4/08 |
| | | | 370/254 |
| 2016/0249352 A1* | 8/2016 | Kim | H04W 56/0015 |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.
U.S. Appl. No. 14/582,959, filed Dec. 24, 2014, 55 pages.
Notice of Allowance for U.S. Appl. No. 15/346,883, dated Sep. 29, 2017, 22 pages.
Notice of Allowance for U.S. Appl. No. 14/582,959, dated Aug. 8, 2016, 21 pages.
Office Action for U.S. Appl. No. 14/570,008 dated Jun. 3, 2016, 27 pages.
Office Action for U.S. Appl. No. 14/570,008 dated Jan. 11, 2017, 19 pages.
Advisory Action for U.S. Appl. No. 14/570,008 dated Apr. 13, 2017, 6 pages.
Office Action for U.S. Appl. No. 14/570,008 dated Nov. 2, 2017, 18 pages.
Notice of Allowance for U.S. Appl. No. 14/570,008 dated Apr. 12, 2018, 14 Pages.

\* cited by examiner

APPARATUS, SYSTEM AND METHOD OF SETTING UP A CONNECTION FOR COMMUNICATION BETWEEN NAN DEVICES

CROSS REFERENCE

This application claims the benefit of and priority from U.S. Provisional Patent Application No. 62/072,640 entitled "Apparatus, System and Method of Peer to Peer Communication", filed Oct. 30, 2014, the entire disclosure of which is incorporated herein by reference.

TECHNICAL FIELD

Embodiments described herein generally relate to peer-to-peer communication.

BACKGROUND

A Peer to Peer (PTP) communication technology, for example, Wireless Fidelity (WiFI) Direct (WFD) Peer to Peer (P2P), may provide an easy and convenient manner to share, show, print and/or synchronize content, e.g., wherever users go.

A Wi-Fi Direct peer to peer (WFD P2P) communication scheme may utilize a Station (STA) Access-Point (AP) (STA/AP) relationship, for example, a P2P Client may include a Wi-Fi Direct device supporting legacy non-AP STA functionality, and a P2P Group Owner may include an "AP-like" function, which may, for example, provide basis Service Set (BSS) functionality and services for associated P2P Clients.

In some scenarios the P2P group scheme may not be efficient and/or optimal.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
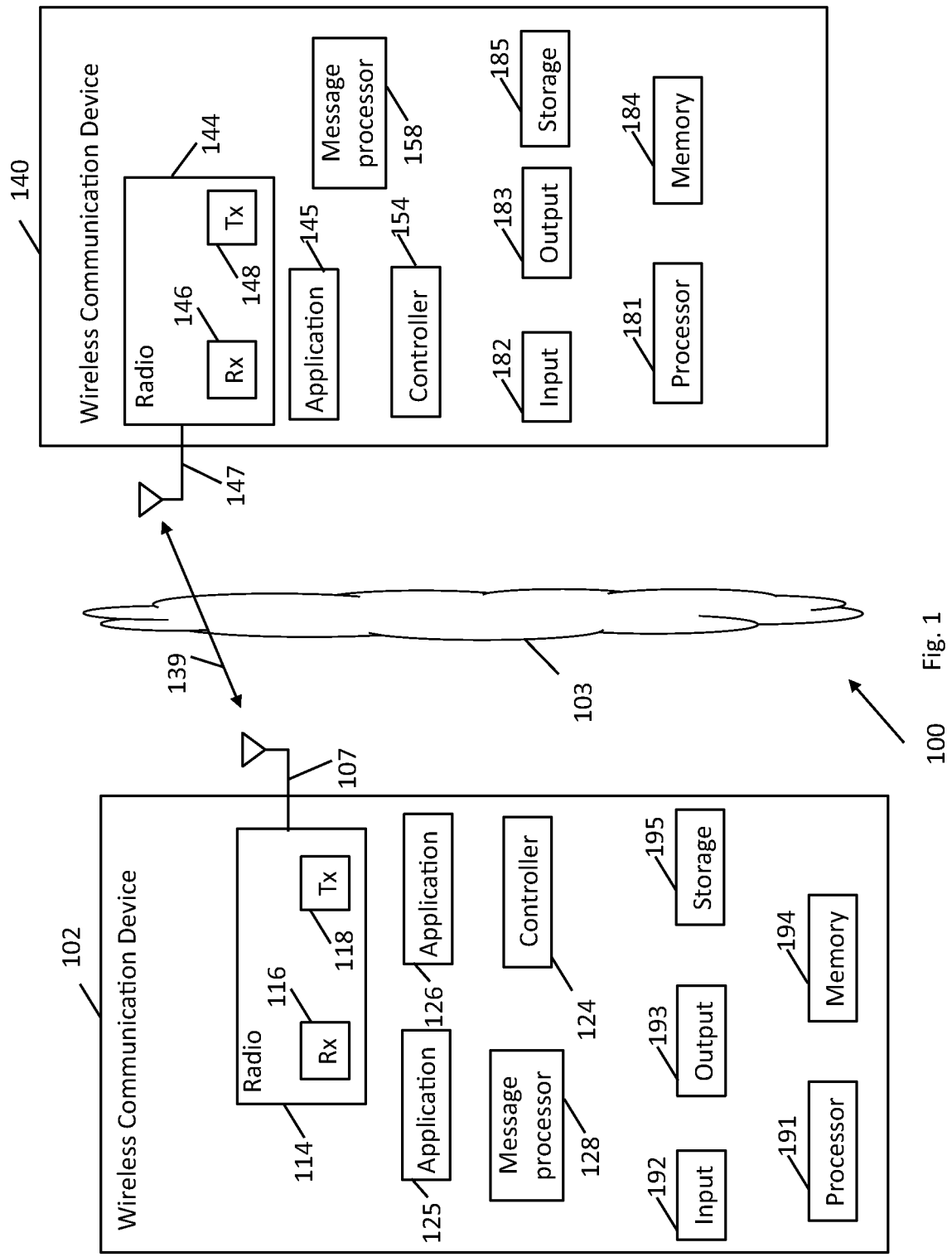
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (WiFi P2P technical specification, version 1.2, 2012) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3:Enhancements for Very High Throughput in the 60 GHz Band", 28 Dec. 2012); IEEE 802.11Revmc; and/or IEEE 802.11x) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi Direct P2P communication. However, other embodiments may be implemented with respect to any other Peer to Peer communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, and/or any other frequency band.

In some demonstrative embodiments, devices 102 and 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form a wireless local area network (WLAN).

In some demonstrative embodiments, wireless communication devices 102 and/or 140 may form a WiFi network.

In some demonstrative embodiments, wireless communication devices 102 and/or 140 may form a WiFi Direct (WFD) network, e.g., a WiFi direct services (WFDS) network, and/or may perform the functionality of one or more WFD devices.

In one example, device 102 and device 140 may include, or may perform the functionality of a WiFi Direct device.

In some demonstrative embodiments, wireless communication medium 103 may include a direct link, for example, a PTP link, e.g., a WiFi direct P2P link, for example, to enable direct communication between device 102 and device 140.

In some demonstrative embodiments, wireless communication devices 102 and/or 140 may perform the functionality of WFD P2P devices. For example, devices 102 and/or 140 may be able to perform the functionality of a P2P client device, and/or P2P group Owner (GO) device.

In some demonstrative embodiments, wireless communication devices 102 and/or 140 may be capable of forming a WiFi Neighbor Awareness Networking (NAN) network and/or may perform the functionality of one or more NAN devices.

In other embodiments, wireless communication devices 102 and/or 140 may form any other network and/or perform the functionality of any other wireless devices or stations.

In some demonstrative embodiments, devices 102 and/or 140 may include one or more applications configured to provide, share, and/or to use one or more services, e.g., a social application, a file sharing application, a media application and/or the like, for example, using a PTP network, a P2P network, WFD network, a NAN network, or any other network.

In some demonstrative embodiments, device 102 may execute an application 125 and/or an application 126. In some demonstrative embodiments, device 140 may execute an application 145.

In some demonstrative embodiments, devices 102 and 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 140 may include a controller configured to control one or more functionalities of devices 102 and/or 140, for example, one or more functionalities of communication, e.g., PTP communication, NAN communication and/or any other communication, between devices 102 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry to cause a device or a station, e.g., devices 102 and/or 140, to perform one or more functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may perform the functionality of a device or station, for example, a PTP device, a WFD P2P device, or a NAN device, capable of discovering other devices according to a discovery protocol and/or scheme.

In some demonstrative embodiments, radios 114 and/or 144 may communicate over wireless communication medium 103 according to a discovery scheme, for example, a NAN discovery scheme, or any other discovery scheme, e.g., as described below.

In some demonstrative embodiments, devices 102 and/or 140 may perform a discovery process according to the discovery scheme, for example, to discover each other and/or to establish a wireless communication link, e.g., directional and/or high throughput wireless communication link.

In some demonstrative embodiments, devices 102 and/or 140 may be configured to enable time synchronization between device 102, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, devices 102 and/or 140 may perform the functionality of NAN devices, e.g., belonging to a NAN cluster, which may share a common set of NAN parameters, for example, including a common NAN timestamp, and/or a common time period between consecutive discovery windows (DWs), e.g., as described below. The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102 and/or 140 may be configured to discover one another over a predefined communication channel ("the social channel"), e.g., as described below. In one example, the Channel 6 in the 2.4 GHz band may be defined as the NAN social channel. Any other channel may be used as the social channel.

In some demonstrative embodiments, devices 102 and/or 140 may transmit discovery frames during the plurality of DWs, e.g., over the social channel.

In one example, devices 102 and/or 140 may transmit the discovery frames to discover each other, for example, to enable using the one or more services provided by applications 125, 126 and/or 145.

In some demonstrative embodiments, devices 102 and/or 140 may communicate during a DW according to a contention mechanism. For example, devices 102 and/or 140 may check whether or not a channel is unoccupied prior to an attempt to transmit a discovery frame during the discovery window.

In some demonstrative embodiments, a device of devices 102 and/or 140, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. A cording to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102 and 140, to advertise its availability, for example, in terms of at least one channel and one or more timeslots, during which the device may be available, e.g., active ("awake), for example, to perform post NAN activities.

In some demonstrative embodiments, the one or more post NAN activities may be defined, for example, to include a P2P operation, a WLAN infrastructure activity, an IBSS attribute activity, a Mesh and Further NAN Service Discovery activity, and/or any other activity or operation.

In some demonstrative embodiments, a robust peer to peer connectivity may be defined as a post NAN activity. The robust peer to peer connectivity may be, for example, conducted based on the availability information advertized during the NAN discovery, for example, using the available channels and time slots that a NAN device advertised in the Availability Interval Bitmap and/or Further Availability Map, e.g., as described below.

In some demonstrative embodiments, devices 102 and/or 140 may communicate according to a Wi-Fi Direct communication scheme, which may be configured, for example, to use a Station (STA) Access-Point (AP) (STA/AP) relationship. For example, devices 102 and/or 140 may be capable of performing the functionality of a P2P Client, which may include, for example, a Wi-Fi Direct device supporting legacy non-AP STA functionality; and/or the functionality of a P2P Group Owner, which may include, for example, an "AP-like" function, which may, for example, provide basis Service Set (BSS) functionality and/or services for associated P2P Clients.

In some demonstrative embodiments, a communication scheme utilizing the functionality of the P2P group owner and P2P client may not be efficient, optimal and/or applicable in some implementations, situations and/or use cases.

In one example, a P2P group owner (GO) may be the "center" of a P2P group controlled by the P2P group owner. Accordingly, the P2P group may be terminated or torn down, for example, if the P2P group owner leaves or disconnects from the P2P group.

For example, a P2P group may be formed by devices of a group of people playing a game session. According to this example, if the person having a device whose role is the Group Owner (GO—SoftAP) decides to leave, it may be needed to restart and/or reestablish the P2P group. As a result the game session may be interrupted or terminated.

In some demonstrative embodiments, devices 102 and/or 140 may be configured to communicate according to a Robust peer-to-peer Networking scheme. The Robust peer-to-peer Networking scheme may be configured to enable a plurality of devices, e.g., a group of devices, to directly setup a peer-to-peer connection, for example, even without requiring a group owner to be involved, e.g., as described below. This flexibility of Robust peer-to-peer connectivity may enable, for example, multiple and/or simultaneous services in an efficient manner, an optimal manner, and/or with an increased User Experience.

In some demonstrative embodiments, devices 102 and/or 140 may be configured to use a secured Robust peer-to-peer (also referred to as "robust PTP" or "Robust P2P") networking connection, e.g., as described below.

In some demonstrative embodiments, devices 102 and/or 140 may be configured to provide, for example, an uninterrupted session, e.g., a gaming/meeting session or any other session, and/or seamless user experience.

In one example, devices 102 and/or 140 may be configured to enable a group of people to play game, while enabling to continue the game, e.g., uninterrupted, for example, even when a player leaves the game, for example, regardless of the role of the devices, e.g., regardless of whether a device leaving the network is performing the functionality of a P2P GO or not.

In some demonstrative embodiments, devices 102 and/or 140 may be configured to setup and/or establish the robust peer-to-peer connection based on information exchanged during the discovery process, e.g., based on NAN service discovery frames exchanged during the NAN service discover, or any other discovery frame of any other discovery process, e.g., as described below.

In some demonstrative embodiments, devices 102 and/or 140 may be configured to setup and/or establish the robust peer-to-peer connection based on information exchanged in the discovery frames, for example, even without performing a separate exchange of detection messages, e.g., after the discovery process.

In one example, devices 102 and/or 140 may be configured to setup and/or establish the robust peer-to-peer connection based on information exchanged in the discovery frames, for example, even without performing P2P group owner negotiation, without exchanging probe request and/or probe response messages, and/or without exchanging one or more other detection and/or negotiation messages.

In some demonstrative embodiments, devices 102 and/or 140 may be configured to provide, for example, a security and provisioning scheme for data protection of traffic communicated over the robust peer-to-peer connection, e.g., as described below.

In some demonstrative embodiments, controllers 124 and/or 154 may be configured to control, for example, one or more functionalities of peer-to-peer communication between devices 102 and/or 140 and/or other devices, one or more functionalities of peer-to-peer networking, e.g., peer-to-peer robust networking, and/or any other functionality, e.g., as described below.

In some demonstrative embodiments, controller 124 may control and/or cause device 102 to perform one or more functionalities of a Robust peer-to-peer device; and/or controller 154 may control and/or cause device 140 to perform one or more functionalities of a Robust peer-to-peer device, e.g., as described below.

In some demonstrative embodiments, the Robust peer-to-peer device, e.g., device 102 and/or device 140, may be configured to support legacy P2P device functionality or non-AP STA functionality, e.g., the functionality of a P2P client device.

In some demonstrative embodiments, the Robust peer-to-peer device, e.g., device 102 and/or device 140, may be configured to support a network security scheme, for example, a WiFi Protected Setup (WPS) Enrollee and/or Internal Registrar functionality, and/or a Device Provisioning Protocol (DPP) functionality.

In some demonstrative embodiments, the Robust peer-to-peer device, e.g., device 102 and/or device 140, may be configured to support one or more NAN features or functionalities, e.g., as described below.

In some demonstrative embodiments, devices 102 and/or 140 may use one or more NAN communications to perform beaconing and/or time synchronization.

In one example, devices 102 and/or 140 may use a NAN Discovery Beacon and/or NAN Sync beacon, for example, to perform time synchronization (sync) among Robust peer-to-peer devices, for example, according to the NAN timestamp.

For example, the Robust peer-to-peer device, e.g., device 102 and/or device 140, may be configured to follow NAN Master election rules and/or Beacon transmit rules, which may be defined with respect to NAN devices, e.g., in a NAN Standard and/or Specification.

In some demonstrative embodiments, devices 102 and/or 140 may not be required to use any other additional beaconing specific to Robust peer-to-peer Networking, although the may.

In some demonstrative embodiments, the Robust peer-to-peer device, e.g., device 102 and/or device 140, may be configured to use a NAN Service Discovery frame, for example, as part of a discovery procedure.

In some demonstrative embodiments, devices 102 and/or 140 may be configured to implement a power saving mechanism, for example, using an availability bitmap.

In one example, the Robust peer-to-peer device, e.g., device 102 and/or device 140, may be configured to advertize an availability of the Robust peer-to-peer device, for example, using an Availability bitmap and/or a Further Availability Bitmap, e.g., as described below.

In some demonstrative embodiments, devices 102 and/or 140 may be configured to perform authentication, to setup a Robust peer-to-peer connection, and/or to disconnect a Robust peer-to-peer connection, e.g., as described below.

In some demonstrative embodiments, the Robust peer-to-peer Networking may use, for example, WPS2 and/or DPP to establish credentials and/or provisioning, e.g., as described below.

In one example, devices 102 and/or 140 may use a Wi-Fi Simple Configuration (WSC) protocol for provisioning. According to this example, a Robust peer-to-peer device, e.g., device 102, which supports WSC Enrollee feature may initiate a WSC procedure, e.g., with another Robust peer-to-peer device, e.g., device 140, which supports a WSC Registrar feature, for example, at an availability of the second device, e.g., based on advertised available channel and/or timeslots, as described below.

In some demonstrative embodiments, the Robust peer-to-peer Networking may use, for example, Robust Security Network (RSN) messages, for example, a RSN 4-ways handshake message sequence, e.g., an 802.11 RSN 4-ways handshake message sequence, to generate and/or distribute, for example, one or more keys, e.g., a Pairwise temporal key (PTK) and/or a Group temporal key (GTK), for message protection, e.g., as described below.

In some demonstrative embodiments, devices 102 and/or 140 may be configured to refresh and/or update the PTK and/or GTK, for example, according to a refresh policy.

In some demonstrative embodiments, a Robust peer-to-peer connection session may be expired, and a Robust peer-to-peer connection may be disconnected, for example, if a PTK does not get refreshed before the expiration of a refresh/update period.

In some demonstrative embodiments, devices 102 and/or 140 may be configured to support a Robust peer-to-peer Connection Session and/or traffic delivery.

In some demonstrative embodiments, a Robust peer-to-peer connection session may be established between two Robust peer-to-peer devices, for example, devices 102 and 140, e.g., as described below.

In some demonstrative embodiments, a Robust peer-to-peer Connection Session may be configured to operate in one or more available channels and time slots of two Robust peer-to-peer devices, e.g., devices 102 and 140, which establish the robust peer-to-peer connection.

In some demonstrative embodiments, two peer-to-peer devices, e.g., devices 102 and 140, may communicate traffic of the robust peer-to-peer connection over a common channel and during one or more common time slots, e.g., as described below.

In some demonstrative embodiments, if, for example, there is no common availability as advertised between two Robust peer-to-peer devices, a Robust peer-to-peer device who plans to transmit a packet may arrive at the available channel and timeslots that a peer device advertised, and may transmit the packet, e.g., as described below.

In some demonstrative embodiments, after receipt of an acknowledge (ACK) frame, the Robust peer-to-peer device may continue transmitting or the peer device can start transmitting. Subsequently, for example, communications may be performed, for example, according to any basic non-AP STA transmitting and receiving functionality, protocol, and/or scheme.

In some demonstrative embodiments, devices 102 may communicate with device 140 one or more messages 139, for example, discovery messages, e.g., WLAN discovery messages, WiFi Service discovery messages, NAN service discovery messages, and/or any other type of messages.

In some demonstrative embodiments, devices 102 and 140 may use the discovery messages to indicate one or more settings, parameters, and/or attributes corresponding to a Robust peer-to-peer connection to be established device 102 and device 140, e.g., as described below.

In some demonstrative embodiments, devices 102 and 140 may communicate a discovery frame 139 according, for example, to a discovery scheme, which may include a plurality of contention-based DWs, e.g., as described above.

In some demonstrative embodiments, controller 124 and/or controller 154 may configure a discovery frame 139 to include an attribute (also referred to as "Robust peer-to-peer Attribute") including one or more fields or information elements (IEs) to include information corresponding to a Robust peer-to-peer device, a Robust peer-to-peer connection, and/or a Robust peer-to-peer network, e.g., as described below.

In some demonstrative embodiments, radio 114 and/or radio 144 may transmit a Robust peer-to-peer Attribute in one or more of messages 139.

In some demonstrative embodiments, radio 114 and/or radio 144 may transmit the Robust peer-to-peer attribute in a NAN Service Discovery frame, for example, to indicate where, e.g., using one or more channels ("advertized channels"), and when, e.g., using one or more time slots ("advertized time slots"), a robust peer-to-peer connection may be established, e.g., as described below.

In some demonstrative embodiments, controller 124 may cause radio 114 to send a discovery frame ("the first discovery frame"), e.g., a NAN Service discovery frame, including a Robust peer-to-peer attribute ("the first Robust peer-to-peer attribute") including availability information ("the first availability information") to indicate at least one first channel and one or more first time slots, e.g., to be used by device 102, as described below.

In some demonstrative embodiments, controller 124 and/or message processor 128 may configure the first availability information as part of a Map control field and/or an Availability intervals bitmap field of the first Robust peer-to-peer attribute, e.g., as described below.

In some demonstrative embodiments, controller 154 may cause radio 144 to send a discovery frame ("the second discovery frame"), e.g., a NAN Service discovery frame, including a Robust peer-to-peer attribute ("the second Robust peer-to-peer attribute") including availability information ("the second availability information") to indicate at least one second channel and one or more second time slots, e.g., to be used by device 140, as described below.

In some demonstrative embodiments, controller 154 and/or message processor 158 may configure the first availability information as part of a Map control field and/or an Availability intervals bitmap field of the second Robust peer-to-peer attribute, e.g., as described below.

In some demonstrative embodiments, radio 114 may receive the second discovery frame from device 140, e.g., during the discovery period, and/or radio 144 may receive the first discovery frame from device 102 e.g., during the discovery period.

In some demonstrative embodiments, radio 114 may transmit the first discovery frame over a social channel, and/or radio 144 may transmit the second discovery frame over the social channel. For example, the social channel may include the NAN social channel. In another example, the social channel may include any other social channel, a control channel, and/or any other predefined channel.

In some demonstrative embodiments, controllers 124 and 154 may setup a Robust peer-to-peer connection between devices 102 and 140 based on the first and second availability information, e.g., as described below.

In some demonstrative embodiments, the first Robust peer-to-peer attribute may include a Media Access Control (MAC) address of device 102 ("the first MAC address"), and/or the second Robust peer-to-peer attribute may include MAC address of device 140 ("the second MAC address").

In some demonstrative embodiments, controllers 124 and 154 may setup the Robust peer-to-peer connection between the first and second MAC addresses.

In some demonstrative embodiments, controllers 124 and 154 may setup the Robust peer-to-peer connection over a channel different from the social channel, for example, based on the first and second availability information, e.g., as described below.

In some demonstrative embodiments, radios 114 and 144 may communicate the first and second discovery frames and/or traffic of the robust peer-to-peer connection over a 2.4 Gigahertz (GHz) frequency band or a 5 GHz frequency band. In other embodiments, radios 114 and 144 may communicate the first and second discovery frames and/or traffic of the robust peer-to-peer connection over any other frequency band.

In some demonstrative embodiments, controllers 124 and 154 may be configured to determine at least one selected channel based on the at least one first channel advertized by the first discovery frame from device 102, and the at least one second channel advertized by the second discovery frame from device 140, e.g., as described below.

In some demonstrative embodiments, controllers 124 and 154 may be configured to determine at least one selected time slot based on the one or more first time slots advertized by the first discovery frame from device 102, and the one or more second time slots advertized by the second discovery frame from device 140, e.g., as described below.

In some demonstrative embodiments, controllers 124 and 154 may communicate traffic of the Robust peer-to-peer connection over the selected channel during the selected time slot, e.g., as described below.

In some demonstrative embodiments, controller 124 may utilize the second availability information received from device 140, for example, to cause radio 114 to operate over the at least one second channel during the one or more second time slots, for example, to receive traffic of the Robust peer-to-peer connection from device 140, e.g., according to the second availability information advertized in the second discovery frame from device 140.

In some demonstrative embodiments, controller 124 may utilize the second availability information received from device 140, for example, to cause radio 114 to transmit traffic of the Robust peer-to-peer connection to device 140 over the at least one second channel and during the one or more second time slots, e.g., according to the second availability information advertized in the second discovery frame from device 140.

In some demonstrative embodiments, controller 154 may utilize the first availability information received from device 102, for example, to cause radio 144 to operate over the at least one first channel during the one or more first time slots, for example, to receive traffic of the Robust peer-to-peer connection from device 102, e.g., according to the first availability information advertized in the first discovery frame from device 102.

In some demonstrative embodiments, controller 154 may utilize the first availability information received from device 102, for example, to cause radio 144 to transmit traffic of the Robust peer-to-peer connection to device 102 over the at least one first channel and during the one or more first time slots, e.g., according to the first availability information advertized in the first discovery frame from device 102.

In some demonstrative embodiments, controllers 124 and 154 may be configured to determine the selected channel to include a channel common to the first and second channels, and/or to determine the selected time slot to include a time slot common to the first and second time slots.

In other embodiments, controllers 124 and 154 may be configured to determine the selected channel and/or the selected time slot based on any other selection method and/or criterion.

In some demonstrative embodiments, the ability to establish a robust peer-to-peer connection between devices 102 and 140 based on the first and second availability information, e.g., as described above, may enable devices 102 and 140 to communicate traffic of the robust peer-to-peer connection over a plurality of channels, and/or during a plurality of time slots, which may be, for example, updated in a dynamic manner.

In some demonstrative embodiments, controller 124 may determine a first selected channel, a first selected time slot corresponding to the first selected channel, a second selected channel, and a second selected time slot corresponding to the second selected channel. For example, controller 124 may determine the first selected channel to include a first channel indicated by the second availability information advertized by device 140, the first selected time slot to include a first time slot indicated by the second availability information advertized by device 140, the second selected channel to include a second channel indicated by the second availability information advertized by device 140, and the second selected time slot to include a second time slot indicated by the second availability information advertized by device 140.

In some demonstrative embodiments, controller 124 may cause radio 114 to communicate with device 140 first traffic of the Robust peer-to-peer connection over the first selected channel during the first selected time slot, and second traffic of the Robust peer-to-peer connection over the second selected channel during the second selected time slot.

In some demonstrative embodiments, the ability to communicate traffic of the robust peer-to-peer connection over a plurality of channels, and/or during a plurality of time slots may enable increased flexibility, may increase channel utilization, may enable improved power management, and/or may provide additional benefits, for example, compared to a peer-to-peer connection established over a constant and/or predefined channel.

In some demonstrative embodiments, controllers 124 and 154 may synchronize communications over the Robust peer-to-peer connection between devices 102 and 140 according to the NAN timestamp.

In some demonstrative embodiments, the ability to synchronize communications over the Robust peer-to-peer connection between devices 102 and 140 according to the NAN timestamp may enable controllers 124 and 154, for example, to synchronize the communications, for example, even without performing a dedicated synchronization procedure, e.g., a TSF synchronization procedure of a P2P group.

In some demonstrative embodiments, controllers 124 and 154 may use the discovery frames to exchange provisioning information to enable controllers 124 and 154 to advertize and/or negotiate a provisioning of the robust peer-to-peer connection between devices 102 and 104, e.g., as described below.

In some demonstrative embodiments, controller 124 may configure the first Robust peer-to-peer attribute to include a provisioning field to indicate a provisioning configuration ("the first provisioning configuration"), for example, a provisioning configuration supported by device 102, e.g., as described below.

In some demonstrative embodiments, controller 154 may configure the second Robust peer-to-peer attribute to include a provisioning field to indicate a provisioning configuration ("the second provisioning configuration"), for example, a provisioning configuration supported by device 140, e.g., as described below.

In some demonstrative embodiments, controllers 124 and 154 may configure the provisioning field to indicate a supported authentication method. For example, controller 124 may configure the provisioning field of the first Robust peer-to-peer attribute to indicate an authentication method supported by device 102, and/or controller 154 may configure the provisioning field of the second Robust peer-to-peer attribute to indicate an authentication method supported by device 140.

In some demonstrative embodiments, controller 124 may configure the provisioning field of the first Robust peer-to-peer attribute to indicate, for example, whether or not device 102 supports an Open authentication procedure; and/or controller 154 may configure the provisioning field of the second Robust peer-to-peer attribute to indicate, for example, whether or not device 140 supports an Open authentication procedure, e.g., as described below.

In some demonstrative embodiments, controller 124 may configure the provisioning field of the first Robust peer-to-peer attribute to indicate, for example, whether or not device 102 supports the WSC protocol for provisioning; and/or controller 154 may configure the provisioning field of the second Robust peer-to-peer attribute to indicate, for example, whether or not device 140 supports the WSC protocol for provisioning, e.g., as described below.

In some demonstrative embodiments, controller 124 may configure the provisioning field of the first Robust peer-to-peer attribute to indicate, for example, whether or not device 102 supports a WSC Enrollee functionality and/or a WSC Registrar functionality; and/or controller 154 may configure the provisioning field of the second Robust peer-to-peer attribute to indicate, for example, whether or not device 140 supports a WSC Enrollee functionality and/or a WSC Registrar functionality.

In some demonstrative embodiments, controller 124 may configure the provisioning field of the first Robust peer-to-peer attribute to indicate, for example, whether or not device 102 supports DPP procedure; and/or controller 154 may configure the provisioning field of the second Robust peer-to-peer attribute to indicate, for example, whether or not device 140 supports a DPP procedure, e.g., as described below.

In some demonstrative embodiments, controllers 124 and 154 may provision the Robust peer-to-peer connection between devices 102 and 140, for example, based on a selected provisioning configuration of the first and second provisioning configurations.

In some demonstrative embodiments, controllers 124 and 154 may be configured to select to use the WSC protocol for provisioning, for example, if both the first and second Robust peer-to-peer attributes indicate that WSC is supported.

In some demonstrative embodiments, controllers 124 and 154 may initiate the WSC procedure, for example, based on the WSC functionality indicated by the first and second Robust peer-to-peer attributes.

In one, the first Robust peer-to-peer attribute may indicate device 102 supports the WSC Enrollee functionality, and the second Robust peer-to-peer attribute may indicate device 140 supports the WSC Registrar functionality. According to this example, controller 124 may initiate the WSC procedure with device 140, for example, at an availability of device 140, e.g., based on advertised available channel and/or timeslots of the second Robust peer-to-peer attribute.

In another example, any other criterion may be used to select the WSC Enrollee and the WSC Registrar. For example, if both devices 102 and 140 support the WSC Enrollee functionality, the WSC Enrollee may be selected, e.g., to include the device which sent an earlier discovery frame, or according to any other criteria.

In some demonstrative embodiments, controllers 124 and 154 may exchange one or more security setup messages, e.g., over the available channels and/or timeslots, for example, to setup a secure Robust peer-to-peer connection between devices 102 and 140.

In some demonstrative embodiments, controllers 124 and 154 may generate one or more security keys to secure the Robust peer-to-peer connection, for example, by using a four-way handshake between devices 102 and 140.

In some demonstrative embodiments, the four-way handshake between devices 102 and 140 may be performed over the one or more selected channels and/or time slots, e.g., according to the first and second availability information.

In some demonstrative embodiments, controllers 124 and 154 may exchange Robust Security Network (RSN) messages, for example, a RSN 4-ways handshake message sequence, e.g., an 802.11 RSN 4-ways handshake message sequence or any other sequence, to generate and/or distribute, for example, one or more keys, e.g., a Pairwise temporal key (PTK) and/or a Group temporal key (GTK), for message protection over the Robust peer-to-peer connection.

In some demonstrative embodiments, controllers 124 and 154 may be configured to refresh and/or update the PTK and/or GTK, e.g., by repeating the 4-way handshake procedure, for example, according to a refresh policy.

In some demonstrative embodiments, controllers 124 and 154 may be configured to set the Robust peer-to-peer connection session to expire, and/or to disconnect the Robust peer-to-peer connection between devices 102 and 140, for example, if the security key does not get refreshed before the expiration of a refresh/update period.

In some demonstrative embodiments, establishing the Robust peer-to-peer connection between devices 102 and 140 according to the first and second Robust peer-to-peer attributes, e.g., as described herein, may enable, for example, controllers 124 and 154 to establish the Robust peer-to-peer connection, e.g., without involving a peer-to-peer Group Owner (GO).

In some demonstrative embodiments, the Robust peer-to-peer Attribute may include one or more fields or information elements (IEs) to include information, e.g., as described above.

In one example, the Robust peer-to-peer Attribute may include, for example, one or more fields of the following attribute:

TABLE 1

| Field | Size (octets) | Value | Description |
|---|---|---|---|
| Attribute ID | 1 | 0x06 | Identifies the type of NAN attribute. |
| Length | 2 | Variable | Length of the following fields in the attribute. |
| MAC Address | 6 | Variable | Indicates interface address of the Robust P2P devices. |
| Provisioning Config Method | 1 | Variable | Bit 0: set to 1 indicates supporting Open Authentication. Otherwise, set to 0. Bit 1-Bit 2: indicate WSC support. 00: Not support WSC (WPS2) 11: Support both WSC Enrollee and WSC Registrar 10: Support WSC Enrollee only 01: Support WSC Registrar only Bit 3: Set to 1 indicates supporting DPP. Otherwise, set to 0. Bit 4-Bit 7 are reserved. |
| Map Control | 1 | Variable | The availability channel and time map control information. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval |

TABLE 1-continued

| Field | Size (octets) | Value | Description |
|---|---|---|---|
| | | | Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

In some demonstrative embodiments, the Robust peer-to-peer Attribute of Table 1 may be, for example, included in a discovery frame, for example, a NAN Service Discovery frame, or any other frame, and transmitted, for example, in the NAN Discovery Window, or during any other time period.

In some demonstrative embodiments, the Robust peer-to-peer Attribute may include any other additional or alternative fields and/or IEs.

In some demonstrative embodiments, device 102 and/or device 140 may transmit, for example, a discovery message, for example, a NAN Service discovery message, including the peer-to-peer Attribute of Table 1, for example, to configure the Robust peer-to-peer connection between devices 102 and 140, e.g., as described above.

Figure 2:
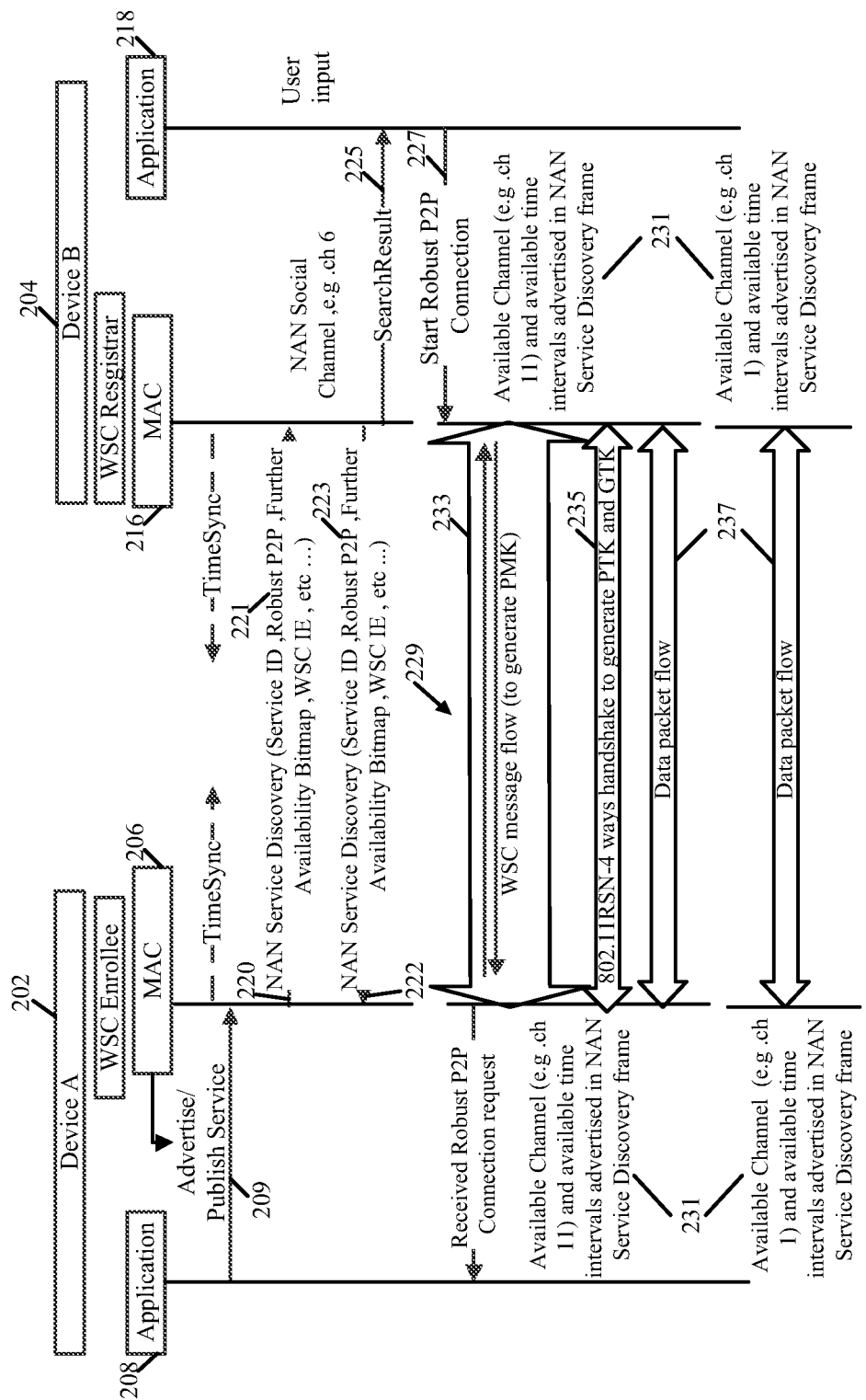
FIG. 2 is a sequence diagram of operations between a first wireless communication device and a second wireless communication device, in accordance with some demonstrative embodiments.

Reference is made to FIG. 2, which schematically illustrates a sequence diagram, which demonstrates operations and interactions between a first wireless communication device (Device A) 202 and a second wireless communication device (Device B) 204, in accordance with some demonstrative embodiments. For example, device 202 may perform the functionality of device 102 (FIG. 1) and/or device 204 may perform the functionality of device 140 (FIG. 1).

In some demonstrative embodiments, device 202 may include a MAC 206 to control communication by device 202 over a wireless medium, and device 204 may include a MAC 216 to control communication by device 204 over the wireless medium. For example, MAC 206 may perform the functionality of controller 124 (FIG. 1), and/or MAC 216 may perform the functionality of controller 154 (FIG. 1).

In some demonstrative embodiments, device 202 may execute an application 208, and/or device 204 may execute an application 218. For example, application 208 may perform the functionality of application 125 (FIG. 1), and/or application 218 may perform the functionality of application 145 (FIG. 1).

In some demonstrative embodiments, application 208 may advertise and/or publish (209) a service.

In some demonstrative embodiments, device 202 may transmit a NAN service discovery frame 220, for example, over the NAN social channel, e.g., channel 6 of the 2.4 GHz band.

In some demonstrative embodiments, NAN service discovery frame 220 may include a Robust peer-to-peer attribute 221 configured to define attributes of a robust peer-to-peer connection to be established by device 202, e.g., subsequent to the NAN discovery.

In some demonstrative embodiments, the Robust peer-to-peer attribute 321 may include, for example, availability information ("first robust peer-to-peer availability information") to define one or more channels and one or more time slots during which device 202 is to be available for the robust peer-to-peer connection, e.g., as described above.

In some demonstrative embodiments, device 204 may transmit a NAN service discovery frame 222, for example, over the NAN social channel, e.g., channel 6 of the 2.4 GHz band.

In some demonstrative embodiments, NAN service discovery frame 222 may include a robust peer-to-peer attribute 223 configured to define attributes of a robust peer-to-peer connection to be established by device 204, e.g., subsequent to the NAN discovery.

In some demonstrative embodiments, the robust peer-to-peer attribute 223 of frame 222 may include, for example, availability information ("second robust peer-to-peer availability information") to define one or more channels and one or more time slots during which device 204 is to be available for the robust peer-to-peer connection, e.g., as described above.

As shown in FIG. 2, MAC 216 may send a search result 225 inform application 218 that the service published by application 208 has been discovered, and may receive an indication 227 to connect to the service.

In some demonstrative embodiments, devices 202 and 404 may exchange one or more messages 229 to setup the robust peer-to-peer connection, for example, over one or more channels and during one or more time slots (231), which may be determined based on the first and/or second robust peer-to-peer availability information, e.g., as described above.

As shown in FIG. 2, devices 202 and 204 may a secure the Robust peer-to-peer connection, e.g., using a WSC message flow 233 over the channels 231.

As shown in FIG. 2, devices 202 and 204 may use an RSN 4-ways handshake 235 over the available channels 231 to generate a PTK and/or a GTK, e.g., as described above.

As shown in FIG. 2, devices 202 and 204 may communicate traffic, e.g., data packets 237, over the Robust peer-to-peer connection, for example, over one or more channels and during one or more time slots (231), which may be determined based on the first and/or second robust peer-to-peer availability information, e.g., as described above.

Figure 3:
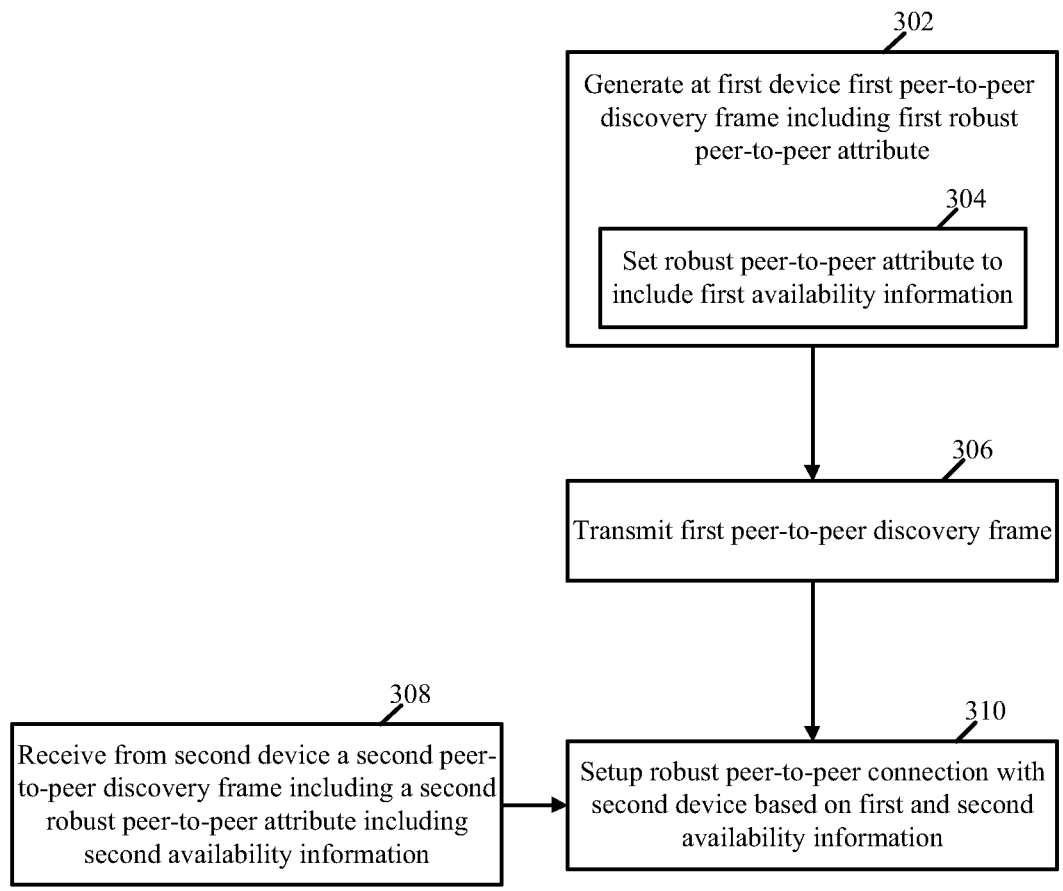
FIG. 3 is a schematic flow-chart illustration of a method of peer-to-peer communication, in accordance with some demonstrative embodiments.

Reference is made to FIG. 3, which schematically illustrates a method of peer to peer communication, in accordance with some demonstrative embodiments. One or more operations of the method of FIG. 3 may be performed, for example, by one or more elements of a system, e.g., system 100 (FIG. 1), a device, e.g., device 102 (FIG. 1), device 140 (FIG. 1), device 202 (FIG. 2), and/or device 204 (FIG. 2), a controller, e.g., controller 124 (FIG. 1), and/or controller 154 (FIG. 1), a radio, e.g., radio 114 (FIG. 1), and/or radio 144 (FIG. 1), and/or a message processor, e.g., message processor 128 (FIG. 1), and/or message processor 158 (FIG. 1).

As indicated at block 302, the method may include generating a first Peer to Peer discovery frame including a first Robust peer-to-peer attribute, e.g., at a first peer to peer device. For example, message processor 128 (FIG. 1) and/or controller 124 (FIG. 1) may generate a first discovery frame, e.g., a first NAN Service discovery frame, including the first Robust peer-to-peer attribute, e.g., as described above.

As indicate at block 304, the method may include setting the Robust peer to peer Attribute to include first availability information to indicate at least one first channel and one or more first time slots. For example, message processor 128 (FIG. 1) and/or controller 124 (FIG. 1) may set the Robust peer to peer attribute to include one or more fields including the first availability information, e.g., as described above.

As indicated at block 306, the method may include transmitting the first Peer to Peer discovery frame. For example, controller 124 (FIG. 1) may cause radio 114 (FIG. 1) to transmit the discovery frame, for example, over a NAN social channel, e.g., as described above.

As indicated at block 308, the method may include receiving from a second peer to peer device a second Peer to Peer discovery frame including a second Robust peer-to-peer attribute, which may include second availability information. For example, radio 114 (FIG. 1) may receive from device 140 (FIG. 1) a second discovery frame, e.g., a second NAN Service discovery frame, including the second Robust peer-to-peer attribute, e.g., as described above.

As indicated at block 310, the method may include setting up a Robust peer-to-peer connection with the second peer-to-peer device based on the first and second availability information. For example, controller 124 (FIG. 1) may setup the robust peer-to-peer connection between devices 102 and 140 (FIG. 1), e.g., as described above.

Figure 4:
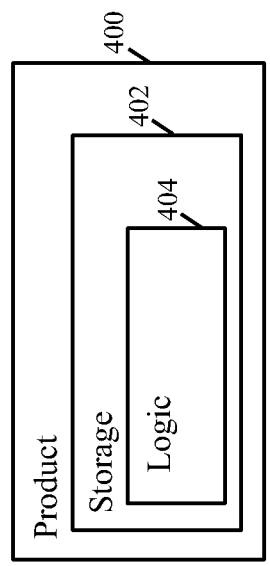
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of devices 102 (FIG. 1), 140 (FIG. 1), 202 (FIG. 2), and/or 204 (FIG. 2), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), to perform one or more operations of the sequence of FIG. 2, and/or to perform one or more of the operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first wireless device comprising a radio to send a first Neighbor Awareness Network (NAN) Service discovery frame including a first Robust peer-to-peer attribute, and to receive from a second wireless device a second NAN Service discovery frame including a second Robust peer-to-peer attribute, the first Robust peer-to-peer attribute including first availability information to indicate at least one first channel and one or more first time slots, the second Robust peer-to-peer attribute including second availability information to indicate at least one second channel and one or more second time slots; and a controller to setup a Robust peer-to-peer connection with the second peer-to-peer device based on the first and second availability information.

Example 2 includes the subject matter of Example 1, and optionally, wherein the controller is to transmit traffic of the Robust peer-to-peer connection to the second wireless device over the at least one second channel and during the one or more second time slots.

Example 3 includes the subject matter of Example 1 or 2, and optionally, wherein the controller is to cause the radio to operate over the at least one first channel and during the one or more first time slots to receive traffic of the Robust peer-to-peer connection from the second wireless device.

Example 4 includes the subject matter of any one of Examples 1-3, and optionally, wherein the controller is to determine at least one selected channel based on the first and second channels, to determine at least on selected time slot based on the first and second time slots, and to communicate with the second wireless device traffic of the Robust peer-to-peer connection over the selected channel during the selected time slot.

Example 5 includes the subject matter of any one of Examples 1-4, and optionally, wherein the controller is to determine a first selected channel, a first selected time slot corresponding to the first selected channel, a second selected channel, and a second selected time slot corresponding to the second selected channel, the controller to cause the radio to communicate with the second wireless device first traffic of the Robust peer-to-peer connection over the first selected channel during the first selected time slot, and second traffic of the Robust peer-to-peer connection over the second selected channel during the second selected time slot.

Example 6 includes the subject matter of any one of Examples 1-5, and optionally, wherein the first availability information is included in a Map control field and an Availability intervals bitmap field of the first Robust peer-to-peer attribute, and the second availability information is included in a Map control field and an Availability intervals bitmap field of the second Robust peer-to-peer attribute.

Example 7 includes the subject matter of any one of Examples 1-6, and optionally, wherein the first Robust peer-to-peer attribute includes a first provisioning field to indicate a first provisioning configuration, the second Robust peer-to-peer attribute includes a second provisioning field to indicate a second provisioning configuration, the controller to provision the Robust peer-to-peer connection based on a selected provisioning configuration of the first and second provisioning configurations.

Example 8 includes the subject matter of Example 7, and optionally, wherein the first provisioning field is to indicate an authentication method supported by the first wireless device.

Example 9 includes the subject matter of any one of Examples 1-8, and optionally, wherein the first Robust peer-to-peer attribute includes a first Media Access Control (MAC) address of the first wireless device, the second Robust peer-to-peer attribute includes a second Media Access Control (MAC) address of the second wireless device, the controller to setup the Robust peer-to-peer connection between the first and second MAC addresses.

Example 10 includes the subject matter of any one of Examples 1-9 wherein the controller is to exchange with the second wireless device one or more security setup messages and to setup a secure Robust peer-to-peer connection with the second wireless device.

Example 11 includes the subject matter of Example 10, and optionally, wherein the controller is to generate one or more security keys using a four-way handshake with the second wireless device according to the first and second availability information.

Example 12 includes the subject matter of any one of Examples 1-11, and optionally, wherein the controller is to synchronize communications over the Robust peer-to-peer connection according to a timestamp of a NAN Beacon frame.

Example 13 includes the subject matter of any one of Examples 1-12, and optionally, wherein the radio is to transmit the first NAN Service discovery frame over a social channel, to receive the second NAN Service discovery frame over the social channel, and to setup the Robust peer-to-peer connection over another channel different from the social channel.

Example 14 includes the subject matter of any one of Examples 1-13, and optionally, wherein the controller is to establish the Robust peer-to-peer connection without involving a peer-to-peer Group Owner (GO).

Example 15 includes the subject matter of any one of Examples 1-14, and optionally, wherein the radio is to communicate with the second wireless device over a 2.4 Gigahertz (GHz) frequency band or a 5 GHz frequency band.

Example 16 includes the subject matter of any one of Examples 1-15, and optionally, the first wireless device being a Wireless Fidelity (Wi-Fi) direct device.

Example 17 includes the subject matter of any one of Examples 1-16, and optionally, including one or more antennas, a processor, and a memory.

Example 18 includes a system comprising a first wireless device, the first wireless device comprising one or more antennas; a memory; a processor; a radio to send a first Neighbor Awareness Network (NAN) Service discovery frame including a first Robust peer-to-peer attribute, and to receive from a second wireless device a second NAN Service discovery frame including a second Robust peer-to-peer attribute, the first Robust peer-to-peer attribute including first availability information to indicate at least one first channel and one or more first time slots, the second Robust peer-to-peer attribute including second availability information to indicate at least one second channel and one or more second time slots; and a controller to setup a Robust peer-to-peer connection with the second peer-to-peer device based on the first and second availability information.

Example 19 includes the subject matter of Example 18, and optionally, wherein the controller is to transmit traffic of the Robust peer-to-peer connection to the second wireless device over the at least one second channel and during the one or more second time slots.

Example 20 includes the subject matter of Example 18 or 19, and optionally, wherein the controller is to cause the radio to operate over the at least one first channel and during the one or more first time slots to receive traffic of the Robust peer-to-peer connection from the second wireless device.

Example 21 includes the subject matter of any one of Examples 18-20, and optionally, wherein the controller is to determine at least one selected channel based on the first and second channels, to determine at least on selected time slot based on the first and second time slots, and to communicate with the second wireless device traffic of the Robust peer-to-peer connection over the selected channel during the selected time slot.

Example 22 includes the subject matter of any one of Examples 18-21, and optionally, wherein the controller is to determine a first selected channel, a first selected time slot corresponding to the first selected channel, a second selected channel, and a second selected time slot corresponding to the second selected channel, the controller to cause the radio to communicate with the second wireless device first traffic of the Robust peer-to-peer connection over the first selected channel during the first selected time slot, and second traffic of the Robust peer-to-peer connection over the second selected channel during the second selected time slot.

Example 23 includes the subject matter of any one of Examples 18-22, and optionally, wherein the first availability information is included in a Map control field and an Availability intervals bitmap field of the first Robust peer-to-peer attribute, and the second availability information is included in a Map control field and an Availability intervals bitmap field of the second Robust peer-to-peer attribute.

Example 24 includes the subject matter of any one of Examples 18-23, and optionally, wherein the first Robust peer-to-peer attribute includes a first provisioning field to indicate a first provisioning configuration, the second Robust peer-to-peer attribute includes a second provisioning field to indicate a second provisioning configuration, the controller to provision the Robust peer-to-peer connection based on a selected provisioning configuration of the first and second provisioning configurations.

Example 25 includes the subject matter of Example 24, and optionally, wherein the first provisioning field is to indicate an authentication method supported by the first wireless device.

Example 26 includes the subject matter of any one of Examples 18-25, and optionally, wherein the first Robust peer-to-peer attribute includes a first Media Access Control (MAC) address of the first wireless device, the second Robust peer-to-peer attribute includes a second Media Access Control (MAC) address of the second wireless device, the controller to setup the Robust peer-to-peer connection between the first and second MAC addresses.

Example 27 includes the subject matter of any one of Examples 18-26, and optionally, wherein the controller is to exchange with the second wireless device one or more security setup messages and to setup a secure Robust peer-to-peer connection with the second wireless device.

Example 28 includes the subject matter of Example 27, and optionally, wherein the controller is to generate one or more security keys using a four-way handshake with the second wireless device according to the first and second availability information.

Example 29 includes the subject matter of any one of Examples 18-28, and optionally, wherein the controller is to synchronize communications over the Robust peer-to-peer connection according to a timestamp of a NAN Beacon frame.

Example 30 includes the subject matter of any one of Examples 18-29, and optionally, wherein the radio is to transmit the first NAN Service discovery frame over a social channel, to receive the second NAN Service discovery frame over the social channel, and to setup the Robust peer-to-peer connection over another channel different from the social channel.

Example 31 includes the subject matter of any one of Examples 18-30, and optionally, wherein the controller is to establish the Robust peer-to-peer connection without involving a peer-to-peer Group Owner (GO).

Example 32 includes the subject matter of any one of Examples 18-31, and optionally, wherein the radio is to communicate with the second wireless device over a 2.4 Gigahertz (GHz) frequency band or a 5 GHz frequency band.

Example 33 includes the subject matter of any one of Examples 18-32, and optionally, wherein the first wireless device is a Wireless Fidelity (Wi-Fi) direct device.

Example 34 includes a method to be performed at a first wireless device comprising sending a first Neighbor Awareness Network (NAN) Service discovery frame including a first Robust peer-to-peer attribute, the first Robust peer-to-peer attribute including first availability information to indicate at least one first channel and one or more first time slots; receiving from a second wireless device a second NAN Service discovery frame including a second Robust peer-to-peer attribute, the second Robust peer-to-peer attribute including second availability information to indicate at least one second channel and one or more second time slots; and setting up a Robust peer-to-peer connection with the second peer-to-peer device based on the first and second availability information.

Example 35 includes the subject matter of Example 34, and optionally, comprising transmitting traffic of the Robust peer-to-peer connection to the second wireless device over the at least one second channel and during the one or more second time slots.

Example 36 includes the subject matter of Example 34 or 35, and optionally, comprising operating over the at least one first channel and during the one or more first time slots to receive traffic of the Robust peer-to-peer connection from the second wireless device.

Example 37 includes the subject matter of any one of Examples 34-36, and optionally, comprising determining at least one selected channel based on the first and second channels, determining at least on selected time slot based on the first and second time slots, and communicating with the second wireless device traffic of the Robust peer-to-peer connection over the selected channel during the selected time slot.

Example 38 includes the subject matter of any one of Examples 34-37, and optionally, comprising determining a first selected channel, a first selected time slot corresponding to the first selected channel, a second selected channel, and a second selected time slot corresponding to the second selected channel, communicating with the second wireless device first traffic of the Robust peer-to-peer connection over the first selected channel during the first selected time slot, and second traffic of the Robust peer-to-peer connection over the second selected channel during the second selected time slot.

Example 39 includes the subject matter of any one of Examples 34-38, and optionally, wherein the first availability information is included in a Map control field and an Availability intervals bitmap field of the first Robust peer-to-peer attribute, and the second availability information is included in a Map control field and an Availability intervals bitmap field of the second Robust peer-to-peer attribute.

Example 40 includes the subject matter of any one of Examples 34-39, and optionally, wherein the first Robust peer-to-peer attribute includes a first provisioning field to indicate a first provisioning configuration, the second Robust peer-to-peer attribute includes a second provisioning field to indicate a second provisioning configuration, the method comprising provisioning the Robust peer-to-peer connection based on a selected provisioning configuration of the first and second provisioning configurations.

Example 41 includes the subject matter of Example 40, and optionally, wherein the first provisioning field is to indicate an authentication method supported by the first wireless device.

Example 42 includes the subject matter of any one of Examples 34-41, and optionally, wherein the first Robust peer-to-peer attribute includes a first Media Access Control (MAC) address of the first wireless device, the second Robust peer-to-peer attribute includes a second Media Access Control (MAC) address of the second wireless device, the method comprising setting up the Robust peer-to-peer connection between the first and second MAC addresses.

Example 43 includes the subject matter of any one of Examples 34-42, and optionally, comprising exchanging with the second wireless device one or more security setup messages and to setup a secure Robust peer-to-peer connection with the second wireless device.

Example 44 includes the subject matter of Example 43, and optionally, comprising generating one or more security keys using a four-way handshake with the second wireless device according to the first and second availability information.

Example 45 includes the subject matter of any one of Examples 34-44, and optionally, comprising synchronizing communications over the Robust peer-to-peer connection according to a timestamp of a NAN Beacon frame.

Example 46 includes the subject matter of any one of Examples 34-45, and optionally, comprising transmitting the first NAN Service discovery frame over a social channel, receiving the second NAN Service discovery frame over the social channel, and setting up the Robust peer-to-peer connection over another channel different from the social channel.

Example 47 includes the subject matter of anyone of Examples 34-46, and optionally, comprising establishing the Robust peer-to-peer connection without involving a peer-to-peer Group Owner (GO).

Example 48 includes the subject matter of any one of Examples 34-47, and optionally, comprising communicating with the second wireless device over a 2.4 Gigahertz (GHz) frequency band or a 5 GHz frequency band.

Example 49 includes a product including one or more tangible computer-readable non-transitory storage media comprising computer-executable instructions operable to, when executed by at least one computer processor, enable the at least one computer processor to implement a method at a first wireless device, the method comprising sending a first Neighbor Awareness Network (NAN) Service discovery frame including a first Robust peer-to-peer attribute, the first Robust peer-to-peer attribute including first availability information to indicate at least one first channel and one or more first time slots; receiving from a second wireless device a second NAN Service discovery frame including a second Robust peer-to-peer attribute, the second Robust peer-to-peer attribute including second availability information to indicate at least one second channel and one or more second time slots; and setting up a Robust peer-to-peer connection with the second peer-to-peer device based on the first and second availability information.

Example 50 includes the subject matter of Example 49, and optionally, wherein the method comprises transmitting traffic of the Robust peer-to-peer connection to the second wireless device over the at least one second channel and during the one or more second time slots.

Example 51 includes the subject matter of Example 49 or 50, and optionally, wherein the method comprises operating over the at least one first channel and during the one or more first time slots to receive traffic of the Robust peer-to-peer connection from the second wireless device.

Example 52 includes the subject matter of any one of Examples 49-51, and optionally, wherein the method comprises determining at least one selected channel based on the first and second channels, determining at least on selected time slot based on the first and second time slots, and communicating with the second wireless device traffic of the Robust peer-to-peer connection over the selected channel during the selected time slot.

Example 53 includes the subject matter of any one of Examples 49-52, and optionally, wherein the method comprises determining a first selected channel, a first selected time slot corresponding to the first selected channel, a second selected channel, and a second selected time slot corresponding to the second selected channel, communicating with the second wireless device first traffic of the Robust peer-to-peer connection over the first selected channel during the first selected time slot, and second traffic of the Robust peer-to-peer connection over the second selected channel during the second selected time slot.

Example 54 includes the subject matter of any one of Examples 49-53, and optionally, wherein the first availability information is included in a Map control field and an Availability intervals bitmap field of the first Robust peer-to-peer attribute, and the second availability information is included in a Map control field and an Availability intervals bitmap field of the second Robust peer-to-peer attribute.

Example 55 includes the subject matter of any one of Examples 49-54, and optionally, wherein the first Robust peer-to-peer attribute includes a first provisioning field to indicate a first provisioning configuration, the second Robust peer-to-peer attribute includes a second provisioning field to indicate a second provisioning configuration, the method comprising provisioning the Robust peer-to-peer connection based on a selected provisioning configuration of the first and second provisioning configurations.

Example 56 includes the subject matter of Example 55, and optionally, wherein the first provisioning field is to indicate an authentication method supported by the first wireless device.

Example 57 includes the subject matter of any one of Examples 49-56, and optionally, wherein the first Robust peer-to-peer attribute includes a first Media Access Control (MAC) address of the first wireless device, the second Robust peer-to-peer attribute includes a second Media Access Control (MAC) address of the second wireless device, the method comprising setting up the Robust peer-to-peer connection between the first and second MAC addresses.

Example 58 includes the subject matter of any one of Examples 49-57, and optionally, wherein the method comprises exchanging with the second wireless device one or more security setup messages and to setup a secure Robust peer-to-peer connection with the second wireless device.

Example 59 includes the subject matter of Example 58, and optionally, wherein the method comprises generating one or more security keys using a four-way handshake with the second wireless device according to the first and second availability information.

Example 60 includes the subject matter of any one of Examples 49-59, and optionally, wherein the method comprises synchronizing communications over the Robust peer-to-peer connection according to a timestamp of a NAN Beacon frame.

Example 61 includes the subject matter of any one of Examples 49-60, and optionally, wherein the method comprises transmitting the first NAN Service discovery frame over a social channel, receiving the second NAN Service discovery frame over the social channel, and setting up the Robust peer-to-peer connection over another channel different from the social channel.

Example 62 includes the subject matter of any one of Examples 49-61, and optionally, wherein the method comprises establishing the Robust peer-to-peer connection without involving a peer-to-peer Group Owner (GO).

Example 63 includes the subject matter of any one of Examples 49-62, and optionally, wherein the method comprises communicating with the second wireless device over a 2.4 Gigahertz (GHz) frequency band or a 5 GHz frequency band.

Example 64 includes an apparatus of wireless communication, the apparatus comprising means for sending from a first wireless device a first Neighbor Awareness Network (NAN) Service discovery frame including a first Robust peer-to-peer attribute, the first Robust peer-to-peer attribute including first availability information to indicate at least one first channel and one or more first time slots; means for receiving at the first wireless device a second NAN Service discovery frame from a second wireless device, the second NAN discovery frame including a second Robust peer-to-peer attribute, the second Robust peer-to-peer attribute including second availability information to indicate at least one second channel and one or more second time slots; and means for setting up a Robust peer-to-peer connection with the second peer-to-peer device based on the first and second availability information.

Example 65 includes the subject matter of Example 64, and optionally, comprising means for transmitting traffic of the Robust peer-to-peer connection to the second wireless device over the at least one second channel and during the one or more second time slots.

Example 66 includes the subject matter of Example 64 or 65, and optionally, comprising means for operating over the at least one first channel and during the one or more first time slots to receive traffic of the Robust peer-to-peer connection from the second wireless device.

Example 67 includes the subject matter of any one of Examples 64-66, and optionally, comprising means for determining at least one selected channel based on the first and second channels, determining at least on selected time slot based on the first and second time slots, and communicating with the second wireless device traffic of the Robust peer-to-peer connection over the selected channel during the selected time slot.

Example 68 includes the subject matter of any one of Examples 64-67, and optionally, comprising means for determining a first selected channel, a first selected time slot corresponding to the first selected channel, a second selected channel, and a second selected time slot corresponding to the second selected channel, communicating with the second wireless device first traffic of the Robust peer-to-peer connection over the first selected channel during the first selected time slot, and second traffic of the Robust peer-to-peer connection over the second selected channel during the second selected time slot.

Example 69 includes the subject matter of any one of Examples 64-68, and optionally, wherein the first availability information is included in a Map control field and an Availability intervals bitmap field of the first Robust peer-to-peer attribute, and the second availability information is included in a Map control field and an Availability intervals bitmap field of the second Robust peer-to-peer attribute.

Example 70 includes the subject matter of any one of Examples 64-69, and optionally, wherein the first Robust peer-to-peer attribute includes a first provisioning field to indicate a first provisioning configuration, the second Robust peer-to-peer attribute includes a second provisioning field to indicate a second provisioning configuration, the apparatus comprising means for provisioning the Robust peer-to-peer connection based on a selected provisioning configuration of the first and second provisioning configurations.

Example 71 includes the subject matter of Example 70, and optionally, wherein the first provisioning field is to indicate an authentication method supported by the first wireless device.

Example 72 includes the subject matter of any one of Examples 64-71, and optionally, wherein the first Robust peer-to-peer attribute includes a first Media Access Control (MAC) address of the first wireless device, the second Robust peer-to-peer attribute includes a second Media Access Control (MAC) address of the second wireless device, the apparatus comprising means for setting up the Robust peer-to-peer connection between the first and second MAC addresses.

Example 73 includes the subject matter of any one of Examples 64-72, and optionally, comprising means for exchanging with the second wireless device one or more security setup messages and to setup a secure Robust peer-to-peer connection with the second wireless device.

Example 74 includes the subject matter of Example 73, and optionally, comprising means for generating one or more security keys using a four-way handshake with the second wireless device according to the first and second availability information.

Example 75 includes the subject matter of any one of Examples 64-74, and optionally, comprising means for synchronizing communications over the Robust peer-to-peer connection according to a timestamp of a NAN Beacon frame.

Example 76 includes the subject matter of any one of Examples 64-75, and optionally, comprising means for transmitting the first NAN Service discovery frame over a social channel, receiving the second NAN Service discovery frame over the social channel, and setting up the Robust peer-to-peer connection over another channel different from the social channel.

Example 77 includes the subject matter of any one of Examples 64-76, and optionally, comprising means for establishing the Robust peer-to-peer connection without involving a peer-to-peer Group Owner (GO).

Example 78 includes the subject matter of any one of Examples 64-77, and optionally, comprising means for communicating with the second wireless device over a 2.4 Gigahertz (GHz) frequency band or a 5 GHz frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a first Neighbor Awareness Networking (NAN) device to:
discover a second NAN device during a Discovery Window (DW) of a NAN cluster having a cluster Time synchronization Function (TSF), the NAN cluster comprising the first and second NAN devices;
transmit a first NAN frame to the second NAN device, the first NAN frame comprising a first attribute comprising first availability information to indicate at least one first channel and one or more first time slots during which the first NAN device is to be available for communication over the at least one first channel, the one or more first time slots are after the DW;
receive a second NAN frame from the second NAN device, the second NAN frame comprising a second attribute comprising second availability information to indicate at least one second channel and one or more second time slots during which the second NAN device is to be available for communication over the at least one second channel;

set up a connection with the second NAN device according to a schedule comprising one or more common time slots and a common channel, the one or more common time slots are common to the one or more first time slots and the one or more second time slots, the common channel is common to the at least one first channel and the at least one second channel, wherein the one or more common time slots are synchronized to the TSF of the NAN cluster comprising the first and second NAN devices; and communicate data with the second NAN device according to the schedule.

2. The apparatus of claim 1, wherein said first availability information comprises a bitmap comprising a plurality of bits corresponding to a respective plurality of time slots, the apparatus configured to cause the first NAN device to set to "1" one or more bits in the bitmap, which correspond to the one or more first time slots, respectively.

3. The apparatus of claim 1 configured to allow the first NAN device to transmit one or more frames to the second NAN device during at least one of the second time slots over the at least one second channel.

4. The apparatus of claim 1 configured to cause the first NAN device to exchange with the second NAN device one or more security messages to setup a secure connection with the second NAN device, and to communicate the data with the second NAN device over the secure connection.

5. The apparatus of claim 4 configured to cause the first NAN device to setup the secure connection according to a 4-way handshake.

6. The apparatus of claim 1, wherein the first NAN frame comprises an interface address of the first NAN device.

7. The apparatus of claim 1, wherein the second NAN frame comprises an interface address of the second NAN device.

8. The apparatus of claim 1 comprising a radio.

9. The apparatus of claim 1 comprising one or more antennas.

10. A product comprising one or more tangible computer-readable non-transitory storage media comprising computer-executable instructions operable to, when executed by at least one processor, enable the at least one processor to cause a first Neighbor Awareness Networking (NAN) device to:

discover a second NAN device during a Discovery Window (DW) shared by devices of a NAN cluster having a cluster Time synchronization Function (TSF), the NAN cluster comprising the first and second NAN devices;

transmit a first NAN frame to the second NAN device, the first NAN frame comprising a first attribute comprising first availability information to indicate at least one first channel and one or more first time slots during which the first NAN device is to be available for communication over the at least one first channel, the one or more first time slots are after the DW;

receive a second NAN frame from the second NAN device, the second NAN frame comprising a second attribute comprising second availability information to indicate at least one second channel and one or more second time slots during which the second NAN device is to be available for communication over the at least one second channel;

set up a connection with the second NAN device according to a schedule comprising one or more common time slots and a common channel, the one or more common time slots are common to the one or more first time slots and the one or more second time slots, the common channel is common to the at least one first channel and the at least one second channel, wherein the one or more common time slots are synchronized to the TSF of the NAN cluster comprising the first and second NAN devices; and communicate data with the second NAN device according to the schedule.

11. The product of claim 10, wherein said first availability information comprises a bitmap comprising a plurality of bits corresponding to a respective plurality of time slots, the instructions, when executed, cause the first NAN device to set to "1" one or more bits in the bitmap, which correspond to the one or more first time slots, respectively.

12. The product of claim 10, wherein the instructions, when executed, allow the first NAN device to transmit one or more frames to the second NAN device during at least one of the second time slots over the at least one second channel.

13. The product of claim 10, wherein the instructions, when executed, cause the first NAN device to exchange with the second NAN device one or more security messages to setup a secure connection with the second NAN device, and to communicate the data with the second NAN device over the secure connection.

14. The product of claim 13, wherein the instructions, when executed, cause the first NAN device to setup the secure connection according to a 4-way handshake.

15. The product of claim 10, wherein the first NAN frame comprises an interface address of the first NAN device.

16. The product of claim 10, wherein the second NAN frame comprises an interface address of the second NAN device.

17. An apparatus for a first Neighbor Awareness Networking (NAN) device, the apparatus comprising:

means for discovering a second NAN device during a Discovery Window (DW) based on a cluster Time synchronization Function (TSF) of a NAN cluster comprising the first and second NAN devices;

means for transmitting a first NAN frame to the second NAN device, the first NAN frame comprising a first attribute comprising first availability information to indicate at least one first channel and one or more first time slots during which the first NAN device is to be available for communication over the at least one first channel, the one or more first time slots are after the DW;

means for receiving a second NAN frame from the second NAN device, the second NAN frame comprising a second attribute comprising second availability information to indicate at least one second channel and one or more second time slots during which the second NAN device is to be available for communication over the at least one second channel;

means for setting up a connection with the second NAN device according to a schedule comprising one or more common time slots and a common channel, the one or more common time slots are common to the one or more first time slots and the one or more second time slots, the common channel is common to the at least one first channel and the at least one second channel, wherein the one or more common time slots are synchronized to the TSF of the NAN cluster comprising the first and second NAN devices; and means for communicating data with the second NAN device according to the schedule.

18. The apparatus of claim 17, wherein said first availability information comprises a bitmap comprising a plurality of bits corresponding to a respective plurality of time slots, the apparatus comprising means for setting to "1" one or more bits in the bitmap, which correspond to the one or more first time slots, respectively.

\* \* \* \* \*